United States Patent
Dimmick

(10) Patent No.: US 9,680,942 B2
(45) Date of Patent: Jun. 13, 2017

(54) DATA VERIFICATION USING ACCESS DEVICE

(71) Applicant: VISA INTERNATIONAL SERVICE ASSOCIATION, San Francisco, CA (US)

(72) Inventor: James Dimmick, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 57 days.

(21) Appl. No.: 14/699,767

(22) Filed: Apr. 29, 2015

(65) Prior Publication Data

US 2015/0319161 A1    Nov. 5, 2015

Related U.S. Application Data

(60) Provisional application No. 61/987,208, filed on May 1, 2014.

(51) Int. Cl.
*G06F 7/04* (2006.01)
*H04L 29/08* (2006.01)
*H04L 29/06* (2006.01)

(52) U.S. Cl.
CPC .......... *H04L 67/18* (2013.01); *H04L 63/0823* (2013.01); *H04L 63/105* (2013.01)

(58) Field of Classification Search
CPC .... H04L 67/18; H04L 63/0823; H04L 63/105
(Continued)

(56) References Cited

U.S. PATENT DOCUMENTS 5,613,012 A   3/1997   Hoffman et al.
5,781,438 A   7/1998   Lee et al.
(Continued)

FOREIGN PATENT DOCUMENTS

EP   2156397 A1   2/2010
WO   0135304 A1   5/2001
(Continued)

OTHER PUBLICATIONS

Wang, U.S. Appl. No. 62/000,288 (unpublished), Payment System Canonical Address Format filed on May 19, 2014.
(Continued)

*Primary Examiner* — Teshome Hailu
(74) *Attorney, Agent, or Firm* — Kilpatrick Townsend & Stockton LLP

(57) ABSTRACT

An embodiment of the invention is directed to a method comprising receiving, at a server computer, information for a portable device that includes a mobile device identifier and storing, by the server computer, the information for the portable device that includes the mobile device identifier in a database associated with the server computer. The method further comprising receiving, by the server computer, transaction data from an access device for a transaction conducted at the access device, determining, by the server computer, from the transaction data that the transaction is associated with the portable device, determining, by the server computer, a location of the access device, determining, by the server computer, a location of a mobile device associated with the mobile device identifier, determining, by the server computer, that the location of the mobile device matches the location of the access device, and marking, by the server computer, the stored information for the portable device as authentication verified.

20 Claims, 8 Drawing Sheets

(58) Field of Classification Search
USPC .......................................................... 726/4
See application file for complete search history.

(56) References Cited

U.S. PATENT DOCUMENTS

| | | | |
|---|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,553 B1 | 4/2010 | Dickelman |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,560 B2 | 2/2011 | Hammad |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,442,894 B2 | 5/2013 | Blackhurst et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |

(56) References Cited

U.S. PATENT DOCUMENTS

| | | | |
|---|---|---|---|
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,762,283 B2 | 6/2014 | Gerber et al. |
| 8,838,982 B2 | 9/2014 | Carlson et al. |
| 8,887,308 B2 | 11/2014 | Grecia |
| 9,065,643 B2 | 6/2015 | Hurry et al. |
| 9,070,129 B2 | 6/2015 | Sheets et al. |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0128977 A1 | 9/2002 | Nambiar et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0030659 A1 | 2/2004 | Gueh |
| 2004/0044739 A1 | 3/2004 | Ziegler |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0084913 A1 | 4/2007 | Weston |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0217046 A1* | 8/2009 | Labaton ........... G06Q 20/10 713/172 |
| 2009/0222891 A1* | 9/2009 | Heffez ........... H04L 63/08 726/3 |
| 2009/0248583 A1 | 10/2009 | Chhabra |
| 2009/0265768 A1* | 10/2009 | Labaton ........... G06Q 20/10 726/5 |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2009/0328052 A1* | 12/2009 | Nguyen ........... G06Q 20/32 718/104 |
| 2010/0008535 A1 | 1/2010 | Abulafia et al. |
| 2010/0024017 A1* | 1/2010 | Ashfield ........... G06F 21/35 726/7 |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |

(56) References Cited

U.S. PATENT DOCUMENTS

| | | |
|---|---|---|
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153496 A1 | 6/2011 | Royyuru |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0191252 A1* | 8/2011 | Dai .................. G06Q 20/10 705/71 |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0130898 A1 | 5/2012 | Snyder et al. |
| 2012/0136780 A1 | 5/2012 | El-Awady et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0244885 A1 | 9/2012 | Hefetz |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0310836 A1 | 12/2012 | Eden et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0030934 A1 | 1/2013 | Bakshi et al. |
| 2013/0031006 A1 | 1/2013 | Mccullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0073463 A1 | 3/2013 | Dimmick et al. |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166450 A1 | 6/2013 | Pama |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |

(56) References Cited

U.S. PATENT DOCUMENTS

| | | |
|---|---|---|
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0119296 A1 | 4/2016 | Laxminarayanan et al. |

FOREIGN PATENT DOCUMENTS

| | | |
|---|---|---|
| WO | 0135304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Sharma et al., U.S. Appl. No. 62/003,717 (unpublished), Mobile Merchant Application filed on May 28, 2014.

Kalgi et al., U.S. Appl. No. 62/024,426, (unpublished) Secure Transactions Using Mobile Devices filed on Jul. 14, 2014.

Prakash et al., U.S. Appl. No. 62/037,033 (unpublished), Sharing Payment Token filed on Aug. 13, 2014.

Hoverson et al., U.S. Appl. No. 62/038,174 (unpublished), Customized Payment Gateway filed on Aug. 15, 2014.

Wang, U.S. Appl. No. 62/042,050 (unpublished), Payment Device Authentication and Authorization System filed on Aug. 26, 2014.

Gaddam et al., U.S. Appl. No. 62/053,736 (unpublished), Completing Transactions Without a User Payment Device filed on Sep. 22, 2014.

Patterson, U.S. Appl. No. 62/054,346 (unpublished), Mirrored Token Vault filed on Sep. 23, 2014.

Dimmick, U.S. Appl. No. 14/952,514 (unpublished), Systems Communications With Non-Sensitive Identifiers filed on Nov. 25, 2015.

Dimmick, U.S. Appl. No. 14/952,444 (unpublished), Tokenization Request via Access Device filed on Nov. 25, 2015.

Prakash et al., U.S. Appl. No. 14/955,716 (unpublished), Provisioning Platform for Machine-To-Machine Devices filed on Dec. 1, 2015.

Wong et al., U.S. Appl. No. 14/966,948 (unpublished), Automated Access Data Provisioning filed on Dec. 11, 2015.

Stubbs et al., U.S. Appl. No. 62/103,522 (unpublished), Methods and Systems for Wallet Provider Provisioning filed on Jan. 14, 2015.

McGuire, U.S. Appl. No. 14/600,523 (unpublished), Secure Payment Processing Using Authorization Request filed on Jan. 20, 2015.

Flurscheim et al., U.S. Appl. No. 15/004,705 (unpublished), Cloud-Based Transactions With Magnetic Secure Transmission filed on Jan. 22, 2016.

Flurscheim et al., U.S. Appl. No. 62/108,403 (unpublished), Wearables With NFC HCE filed on Jan. 27, 2015.

Sabba et al., U.S. Appl. No. 15/011,366 (unpublished), Token Check Offline filed on Jan. 29, 2016.

Patterson, U.S. Appl. No. 15/019,157 (unpublished), Token Processing Utilizing Multiple Authorizations filed on Feb. 9, 2016.

Cash et al., U.S. Appl. No. 15/041,495 (unpublished), Peer Forward Authorization of Digital Requests filed on Feb. 11, 2016.

Le Saint et al., , U.S. Appl. No. 15/008,388 (unpublished), Methods for Secure Credential Provisioning filed on Jan. 27, 2016.

Kinagi, U.S. Appl. No. 62/117,291 (unpublished), Token and Cryptogram Using Transaction Specific Information filed on Feb. 17, 2015.

Galland et al. U.S. Appl. No. 62/128,709 (unpublished), Tokenizing Transaction Amounts filed on Mar. 5, 2015.

Rangarajan et al., U.S. Appl. No. 61/751,763 (unpublished), Payments Bridge filed on Jan. 11, 2013.

(56) References Cited

OTHER PUBLICATIONS

Li, U.S. Appl. No. 61/894,749 (unpublished), Methods and Systems for Authentication and Issuance of Tokens in a Secure Environment filed on Oct. 23, 2013.
Aissi et al., U.S. Appl. No. 61/738,832 (unpublished), Management of Sensitive Data filed on Dec. 18, 2012.
Wong et al., U.S. Appl. No. 61/879,362 (unpublished), Systems and Methods for Managing Mobile Cardholder Verification Methods filed on Sep. 18, 2013.
Powell, U.S. Appl. No. 61/892,407 (unpublished), Issuer Over-The-Air Update Method and System filed on Oct. 17, 2013.
Powell, U.S. Appl. No. 61/926,236 (unpublished), Methods and Systems for Provisioning Mobile Devices With Payment Credentials and Payment Token Identifiers filed on Jan. 10, 2014.
International Search Report and Written Opinion mailed Jul. 30, 2015 in PCT/US2015/028365, 16 pages.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Fitzgerald, K. (Feb. 3, 2010). "Report: 3-D Secure Not What Name Suggests," *American Banker*, 3 pages.

\* cited by examiner

DATA VERIFICATION USING ACCESS DEVICE

CROSS-REFERENCES TO RELATED APPLICATIONS

This application is a non-provisional of and claims priority to U.S. provisional application No. 61/987,208, filed on May 1, 2014, which is herein incorporated by reference in its entirety for all purposes.

BACKGROUND

In conventional physical or proximity transactions, there are many ways to verify that a user utilizing a portable device to make a transaction is indeed the user authorized to use that portable device. For example, a user may use a portable device that has been securely issued by their bank, such as a credit card with a mag stripe or a debit card with a contactless chip, to interact with an access device at a merchant to make a payment. The data from the mag stripe and a physical signature (for example) can be used to authenticate the user as the authorized user of the portable device. Or the contactless chip on the portable device can exchange data with the access device to provide further authentication and security. This data can additionally be sent to an authorization server such as at a payment processing network or issuer to compare it with stored data to authenticate the user or portable device.

Remote transactions are becoming more and more common place. There are a number of security and usability issues with remote transactions that do not exist in physical or proximity transactions. For example, a user may use his portable device, such a credit card with a mag stripe or a debit card with a contactless chip, to make a purchase at a merchant via the merchant's website. Instead of swiping the card at an access device so that the mag stripe or chip on the card can interact with the access device to exchange information, the user simply inputs his account number and expiration date (for example). Since there is no physical or proximity interaction with the portable device, traditional means of providing authentication and additional security are not effective.

There are some solutions that have emerged to address issues of authentication in remote transactions. One example is 3D Secure which allows entities such as Visa, MasterCard, and American Express to provide additional means to authenticate a portable device. For example, a password based method may be used which requires a user to register a password and then to input the password during each remote purchase transaction. This can be burdensome to the user whose payment experience may be interrupted to setup and register a password, and then to remember and enter the password for every remote transaction. Such a solution can also be expensive for a merchant or other entity to implement and maintain. Moreover, this solution can introduce other security issues. For example, password based solutions typically require a pop-up window to appear during the user's payment transaction. It may be difficult for the user to distinguish between a legitimate pop up window and a fraudulent phishing site. An inline frame may be used instead of a pop-up to reduce user confusion, but this may make it even harder for a user to verify that the inline frame is genuine. In addition, a user may not be allowed to proceed with a payment until they have registered a 3D Secure password. If a user does not want to risk providing the information during the purchase (or cannot remember the password), the user may have to cancel the transaction. Furthermore, many mobile browsers may not support inline frames or pop-ups and thus, the security feature may not work correctly on many mobile devices.

A more secure and effective way to authenticate users and portable devices is needed.

BRIEF SUMMARY

Embodiments of the invention are directed to systems, apparatuses, and methods to authenticate users and portable devices.

One embodiment of the invention is directed to a method comprising receiving, at a server computer, information for a portable device that includes a mobile device identifier, and storing, by the server computer, the information for the portable device that includes the mobile device identifier in a database associated with the server computer. The method further comprising receiving, by the server computer, transaction data from an access device for a transaction conducted at the access device, determining, by the server computer, from the transaction data that the transaction is associated with the portable device, determining, by the server computer, a location of the access device, determining, by the server computer, a location of a mobile device associated with the mobile device identifier, determining, by the server computer, that the location of the mobile device matches the location of the access device, and marking, by the server computer, the stored information for the portable device as authentication verified.

Another embodiment of the invention is directed to a server computer comprising a processor and a non-transitory computer readable medium coupled with the processor. The computer readable medium comprising instructions executable by the processor, the instructions comprising receiving information for a portable device that includes a mobile device identifier and storing the information for the portable device that includes the mobile device identifier in a database associated with the server computer. The instructions further comprising receiving transaction data from an access device for a transaction conducted at the access device, determining from the transaction data that the transaction is associated with the portable device, determining a location of the access device, determining a location of a mobile device associated with the mobile device identifier, determining that the location of the mobile device matches the location of the access device, and marking the stored information for the portable device as authentication verified.

Another embodiments of the invention is directed to a computer apparatus comprising a processor and a non-transitory computer readable medium coupled with the processor. The computer readable medium comprising instructions executable by the processor, the instructions comprising sending information for a portable device that includes a mobile device identifier, to a server computer wherein the server computer stores the information for the portable device that includes the mobile device identifier in a database associated with the server computer, receiving transaction data for a transaction conducted using the portable device, and sending the transaction data to a server computer wherein the server computer determines a location of an access device associated with the mobile device identifier, determines a location of the mobile device associated with the mobile device identifier, determines that the location of the mobile device identifier matches the location of the access device, and marks stored information in the authentication database as authentication verified.

These and other embodiments of the invention are further described below.

BRIEF DESCRIPTION

DETAILED DESCRIPTION

Figure 1:
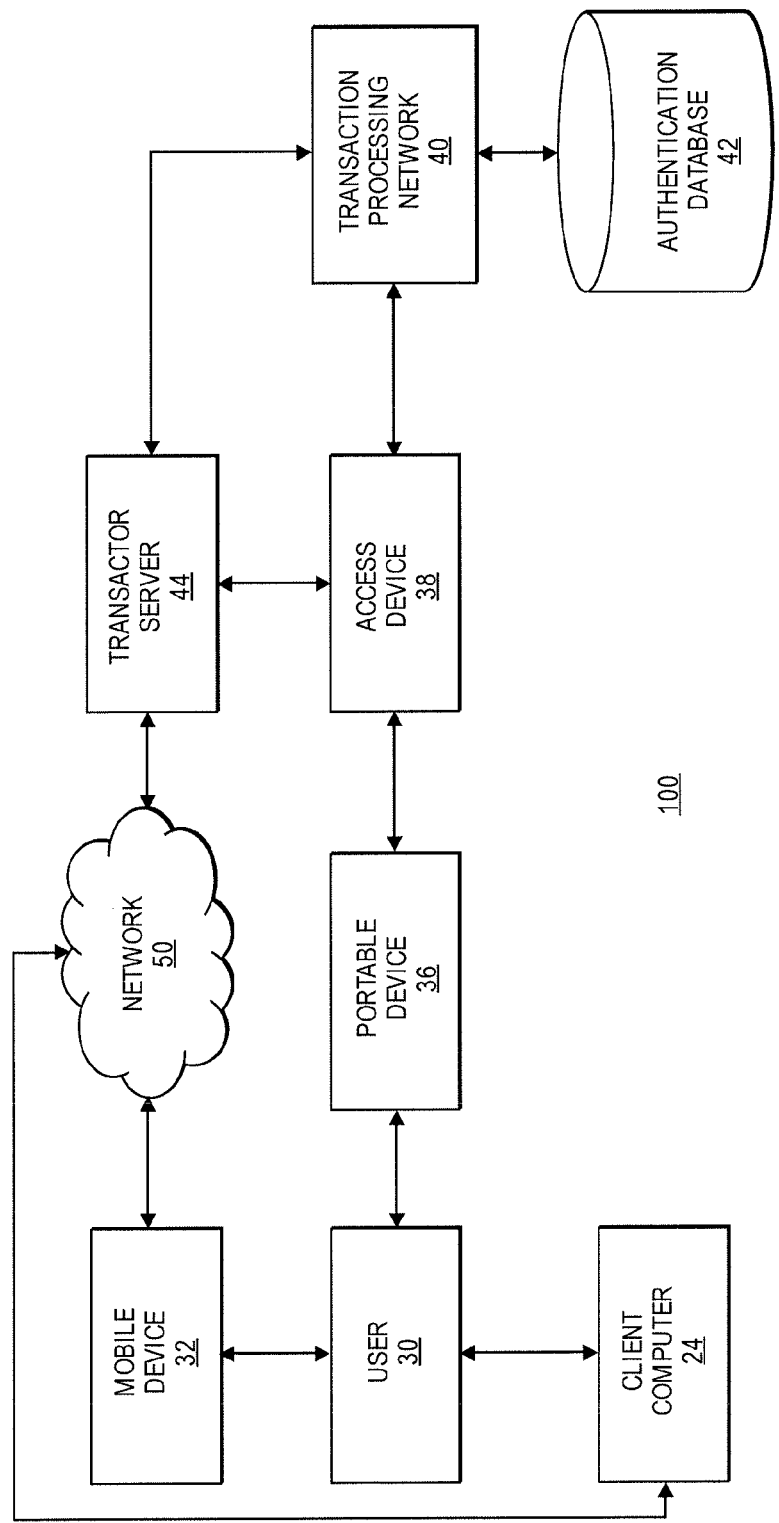
FIG. 1 shows a block diagram of a system according to embodiments of the invention.

Embodiments of the invention are directed to systems, apparatuses, and methods to authenticate portable devices. For example, a user may provide information to register a portable device for authentication of remote transactions (e.g., primary account number (PAN), expiry date for the portable device, a card verification value (CVV), etc.). The user may also provide a mobile device identifier (e.g., a mobile phone number). The user may provide this information to a transactor (e.g., merchant) during a remote, physical, or proximity transaction or a user may utilize an electronic wallet (e.g., Amazon wallet, Google wallet, etc.) and provide information in the electronic wallet.

The information provided by the user may be sent to a transaction processing network. The transaction processing network may store the information in an authentication database and indicate that the stored information is not yet authentication verified. The next time the user conducts a physical or proximity transaction at an access device associated with a transactor/merchant, the access device or transactor server associated with the access device may send transaction data to a transaction processing network. The transaction processing network may determine from the transaction data that the transaction is associated with a portable device that has been registered to be authentication verified but that is not yet authentication verified. The transaction processing network may determine that the location of the access device and the location of a mobile device associated with the mobile device identifier match and thus, verify that the information associated with the portable device is authentic. The transaction processing network may mark the stored information for the portable device as authentication verified. The next time the user conducts a remote transaction using the portable device, the system can confirm that the portable device is authentication verified and utilize a CAVV, digital certificate, or other means during the transaction to provide additional security for the remote transaction.

Other embodiments of the invention allow for using messages sent to a user's mobile device and using tokens to verify authentication of the portable device.

Embodiments of the invention provide novel ways to authenticate a portable device for remote transactions where conventional methods are not effective. In contrast to conventional systems for authenticating remote transactions, such as password based 3D Secure solutions, embodiments of the invention do not require a cumbersome process by the user, or implementation and maintenance of an expensive system for the merchant or other entities in the system. By matching up transaction data and location information from a physical or proximity transaction with stored registration information for a portable device (for example), embodiments of the invention provide for a more secure and efficient systems for authenticating a portable device and providing security means for remote transactions, without imposing burdensome methods on users, merchants, and other entities involved in remote transactions.

I. Exemplary System

FIG. 1 shows an exemplary system 100 according to embodiments of the invention. Although some of the entities and components in FIG. 1 may be depicted as separate, in some instances, one or more of the components may be combined into a single device or location (and vice versa). Similarly, although certain functionality may be described as being performed by a single entity or component within the system, the functionality may in some instances be performed by multiple components and/or entities (and vice versa). Moreover, for simplicity, only one user, one mobile device, one client computer, one portable device, one access device, etc. are shown in FIG. 1. It is understood that the system 100 may comprise multiple users, mobile devices, client computers, portable devices, access device, etc. Communication between entities and components may comprise the exchange of data or information using electronic messages and any suitable electronic communication medium and method, as described below.

The system 100 includes a user 30. The user 30 may be an individual, or an organization such as a business, that is capable of conducting transactions such as purchasing goods or services, transferring money, etc. The user 30 may use a portable device 36 to conduct a transaction. For example, a portable device 36 may be a payment card such as a credit card, debit card, or a prepaid card, used to conduct a transaction, such as to provide payment information to a merchant.

The portable device 36 may be in any suitable form. For example suitable portable devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable devices include cellular phones, personal digital assistants (PDAs), pagers, payment cards, security cards, access cards, smart media, transponders, 2-D barcodes, an electronic or digital wallet, and the like. Portable devices may also include wearable devices such as smart watches, fitness bands, ankle bracelets, rings earrings, etc. If the portable device is in the form of a debit, credit, or smartcard, the portable device may also optionally have features such as magnetic stripes and/or computer chips. Such devices can operate in either a contact (e.g., physical) or contactless (e.g., proximity) mode.

A portable device 36 in the form of a card may comprise a plastic substrate. In some embodiments, a contactless element for interfacing with an access device 38 may be present on, or embedded within, the plastic substrate. Portable device information such as an account number, expiration date, and/or a user name may be printed or embossed on the card. A magnetic stripe may also be on the plastic substrate. In some embodiments, the portable device 36 may comprise a microprocessor and/or memory chips with user data stored in them. In some embodiments, both a magnetic stripe and a contactless element may be in the portable device 36. In some embodiments, either a magnetic stripe or a contactless element may be present in the portable device 36.

A user 30 may operate a mobile device 32 to communicate with a transactor server 44. The mobile device 32 may be may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network (e.g., network 50) such as the Internet or a private network.

Examples of mobile devices include mobile phones (e.g. cellular phones), PDAs, tablet computers, net books, laptop computers, personal music players, hand-held specialized readers, etc. A mobile device 32 may comprise any suitable hardware and software for performing such functions, and may also include multiple devices or components (e.g. when a device has remote access to a network by tethering to another device—i.e. using the other device as a modem—both devices taken together may be considered a single mobile device). A mobile device 32 may also comprise a verification token in the form of, for instance, a secured hardware or software component within the mobile device 32 and/or one or more external components that may be coupled to the mobile device 32.

The mobile device 32 may also be used as a portable device in some embodiments of the invention. For example, the mobile device 32 may contain technology to be used to conduct transactions, such as at an access device 38 to make a payment by placing the device near the access device 38. Portable device information can be transferred to the access device via short range communication technology such as NFC (Near Field Communication) technology. The mobile device 32 may utilize an electronic wallet or digital wallet to conduct such a transaction. An electronic wallet or digital wallet can store user profile information, payment information, bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. An electronic wallet may comprise any suitable software that provides front end functionality of the electronic wallet to the user 30. For example, the electronic wallet may be embodied as a software application downloadable by a computer apparatus or mobile device 32 (e.g., a mobile phone). In some instances, the electronic wallet may provide a user interface (such as a series of menus or other elements) that allows the user 30 to manage his electronic wallet(s). In some embodiments, the electronic wallet may store data in a computer readable memory for later use, such as user 30 preferences or identifiers associated with funding sources added to the electronic wallet.

The client computer 34 may be a personal computer or the like. The user 30 may use the client computer 34 to conduct transactions such as conducting a payment transaction on a transactor (e.g., merchant) website via a network 50 (e.g., the internet) and a transactor server 44.

The transactor server 44 may be a server computer associated with a transactor such as a merchant. A transactor may refer to an entity that engages in transactions and can sell goods or services to a user. The terms "transactor" and "merchant" may be used interchangeably throughout this application.

As used herein, a server computer is typically a powerful computer or cluster of computers. For example, the server computer can be a large mainframe, a minicomputer cluster, or a group of servers functioning as a unit. In one example, the server computer may be a database server coupled to a Web server.

The access device 38 may be any suitable device for communicating with a transaction processing network 40, and for interacting with a portable device 36 or mobile device 32. An access device 38 may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device 38 may use any suitable contact or contactless mode of operation to send or receive data from, or associated with, a portable device 36 and/or a user mobile device 32. In some embodiments, where an access device 38 may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable device 36 and/or mobile device 32. The access device 38 may generally be located in any suitable location. For example, in a physical or proximity transaction situation, the access device 38 may be located at the location of a transactor/merchant. In a remote transaction situation the access device 38 may be a computer, such a transactor server 44 (e.g., a merchant server computer), accessible by a user 30 using a website or application over a network 50 such as the internet or an application on a mobile device or client computer. In physical or proximity transactions, the access device 38 may be coupled with a transactor server 44.

The transaction processing network 40 may include data processing subsystems, networks, and operations used to support and deliver authorization services, exception file services, and clearing and settlement services. For example, the transaction processing network 40 may comprise a server computer, coupled to a network interface (e.g. by an external communication interface), and a database(s) of information. The server computer may comprise a processor and a non-transitory computer readable medium coupled with the processor. The non-transitory computer readable medium may comprise instructions executable by the processor, the instructions comprising functionality described herein.

Figure 3:
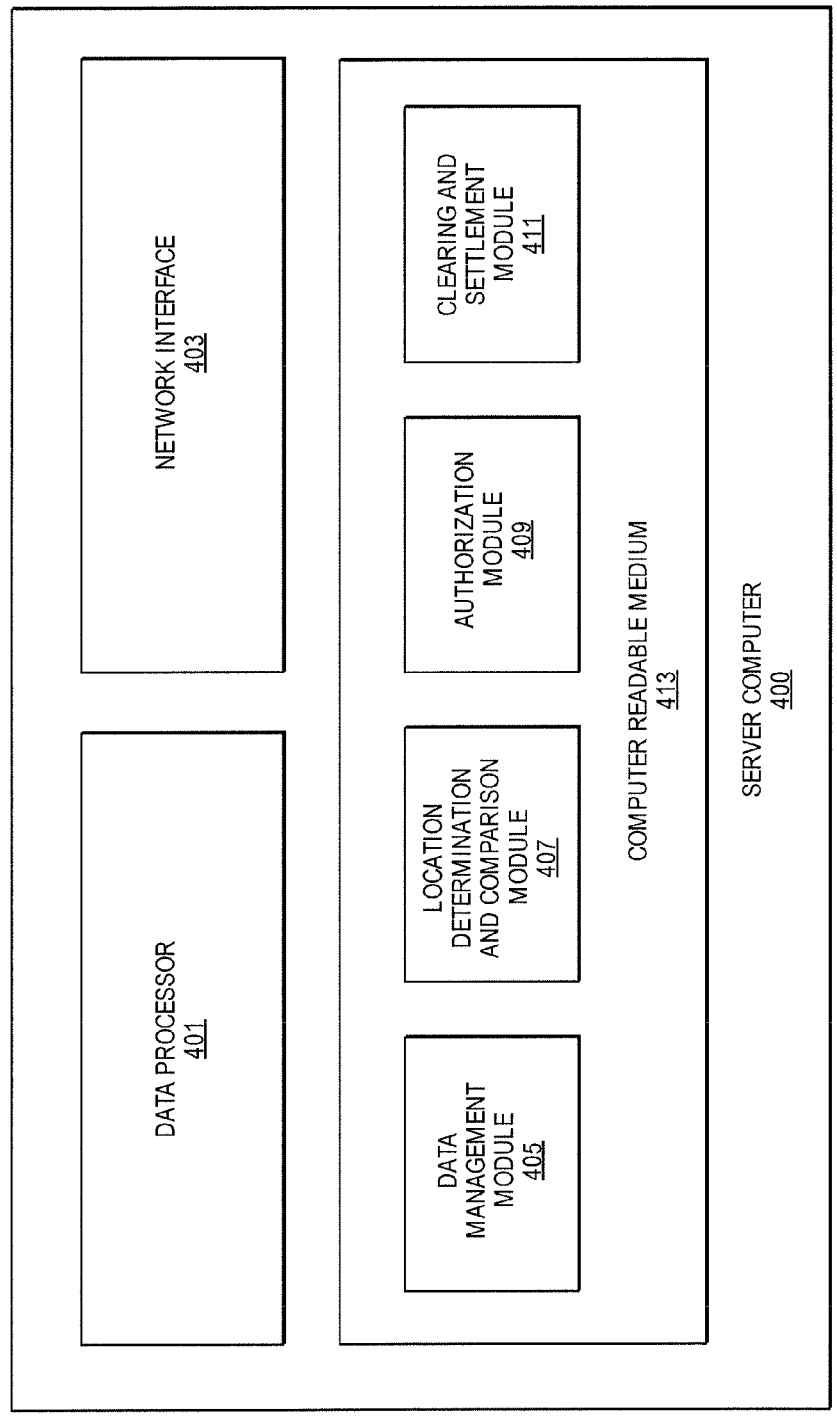
FIG. 3 shows a block diagram of an exemplary server computer according to embodiments of the invention.

An exemplary server computer 400 is shown in FIG. 3. The exemplary server computer 400 is illustrated as comprising a plurality of hardware and software modules (401-413). It should be appreciated that this is provided for illustration purposes only, and each of the modules and associated functionality may be provided and/or performed by the same or different components. Exemplary server 400 may for example, perform some of the relevant functions and steps described herein with reference to the transaction processing network 40 through the use of any suitable combination of software instructions and/or hardware configurations. It should be noted that although FIG. 3 illustrates all of the modules located on a single device, the disclosure is not meant to be so limited. Moreover, a system for implementing the functionality described herein may have additional components or less than all of these components. Additionally, some modules may be located on other devices such as a remote server or other local devices that are functionally connected to the server computer component(s).

The exemplary server computer 400 is shown as comprising data processor 401, network interface 403, and computer readable medium 413. The computer readable medium may comprise a number of modules (405-411). The data management module 405 may be configured to manage data received by and transmitted from the transaction processing network 40 (e.g., data from an authorization request message, and authorization response message, data related to a mobile device, data related to a portable device, etc.). The location determination and comparison module 407 may be configured to determine location information for various components of the system 100 and compare locations of various components in the system 100 to determine if they are near each other in location. The authorization module 409 may be configured to perform transaction authorization functions (e.g., authorize a payment transaction, etc.). The clearing and settlement module 411 may be configured to perform transaction clearing and settlement functions.

An exemplary transaction processing network 40 may include VisaNet™ etc. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The Transaction processing network 40 may use any suitable wired or wireless network, including the Internet. Although many of the data processing functions and features of some embodiments may be present in the transaction processing network 40 (and a server computer therein), it should be understood that such functions and features could be present in other components such as an issuer computer, and need not be present in the transaction processing network 40, or a server computer therein.

Figure 2:
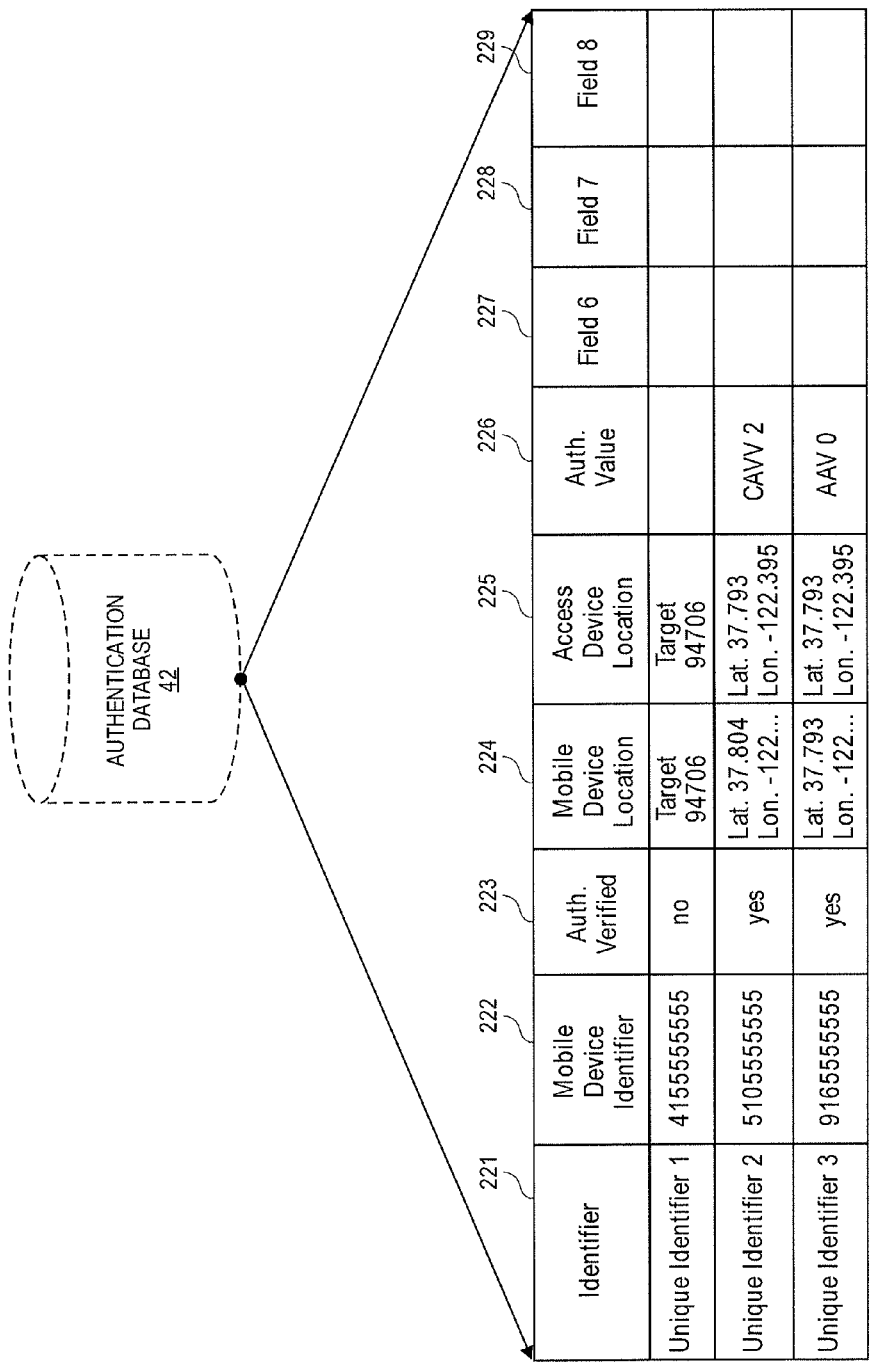
FIG. 2 shows a block diagram of an exemplary database according to embodiments of the invention.

The transaction processing network 40 may be coupled with an authentication database 42. The authentication database 42 may store authentication information for portable consumer devices. FIG. 2 shows an exemplary layout of authentication database 42. The authentication database 42 may have a number of fields such as the identifier field and fields shown as references numbers 221-229. For example, reference number 221 may be a unique identifier. An example of a unique identifier may be a primary account number (PAN) such as a sixteen digit PAN (e.g., 4003 3385 5518 2312). The other fields 222-229 may store further information associated with each unique identifier. For example, the authentication database 42 may store account numbers (e.g., primary account number (PANs)), mobile phone numbers, CVVs, Cardholder Authentication Verification Values (CAVV), digital certificates, tokens, other identification information, etc. Identification information may include any suitable information associated with an account (e.g. a payment account and/or portable device associated with the account). Such information may be directly related to the account or may be derived from information related to the account. Examples of account information may include a PAN, user name, expiration date, CVV (card verification value), dCVV (dynamic card verification value), CVV2 (card verification value 2), CVC3 card verification values, etc. CVV2 is generally understood to be a static verification value associated with a portable/payment device. CVV2 values are generally visible to a user (e.g., a consumer), whereas CVV and dCVV values are typically embedded in memory or authorization request messages and are not readily known to the user (although they are known to the issuer and transaction processor).

The entities represented in FIG. 1 may communicate using any suitable communications mediums and methods. Suitable communications channels may be present directly between two entities such as a transaction processing network and a transactor (e.g., merchant) or issuer computer, or may include a number of different entities. Any suitable communications protocols may be used for generating a communications channel. A communication channel may in some instance comprise a secure communication channel, which may be established in any known manner, including the use of mutual authentication and a session key and establishment of an SSL session. However, any method of creating a secure channel may be used. By establishing a secure channel, sensitive information related to a portable/payment device (such as account number, CVV values, expiration dates, etc.) may be securely transmitted between the two entities to facilitate a transaction.

As used herein, short range communication or short range wireless communication may comprise any method of providing short-range contact or contactless communications capability, such as RFID, Bluetooth™, infra-red, or other data transfer capability that can be used to exchange data between a portable device, mobile device, etc., and an access device. In some embodiments, short range communications may be in conformance with a standardized protocol or data transfer mechanism (e.g., ISO 14443/NFC). Short range communication typically comprises communications at a range of less than 2 meters. In some embodiments, it may be preferable to limit the range of short range communications (e.g. to a range of less than 1 meter, less than 10 centimeters, or less than 2.54 centimeters) for security, technical, and/or practical considerations. For instance, it may not be desirable for an access device (e.g., POS terminal) to communicate with every portable device that is within a 2 meter radius because each of those portable devices may not be involved in a transaction, or such communication may interfere with a current transaction involving different financial transaction devices. Typically the portable device or the access device also includes a protocol for determining resolution of collisions (i.e. when two portable devices are communicating with the access device simultaneously). The use of short range communications may be used when the transactor (e.g., merchant) and the user are in close geographic proximity, such as when the consumer is at the merchant's place of business.

As used herein, transaction data/information or purchase/payment transaction data/information may refer to any information corresponding to or describing purchases, orders, invoices, payments involving goods, items, services, and/or the like, and may include, but is not limited to, a purchase amount, a merchant identifier, description code (e.g., NAICS: North American Industry Classification System) associated with purchased items, cost of purchased items, and transactions as well as descriptions of purchased items, purchase dates, purchase amounts, indications of payments accounts used, indications of whether purchases were made online, confirmation numbers, order numbers, cancellation numbers, shipment status updates (e.g., order being processed, shipped, delivered, on back order, etc.), delivery tracking numbers, cancellation notices, updates, and/or the like.

II. Exemplary Transactions

In typical physical or proximity payment, a user 30 may conduct a transaction using a portable device 36 (e.g., credit card, debit card, etc.) at an access device 38 such as a Point-of-Sale (POS) terminal at a merchant (e.g., grocery store). The user 30 may present his portable device 36 to the access device 38 to pay for an item or service. The portable device 36 and the access device 38 may interact such that information form the portable device (e.g., account identifier, verification value(s), expiration date, etc.) is received by the access device (e.g., via contact or contactless interface). For example, if the transaction is a physical payment transaction, the user 30 may slide his portable device 36 (e.g., credit card) through a slot on the POS terminal or make other physical contact between the portable device 36 and access device 38 to exchange portable device information and other data with the access device 38. If the transaction is a proximity payment, the user 30 may wave or place his portable device 36 near the access device 38 to exchange portable device information and other data with the access device 38.

The access device 38 or a transactor server 44 associated with the access device 38 may generate an authorization request message that includes the information received from the access device (e.g., information corresponding to the portable device 36) along with additional transaction information (e.g., a transaction amount, merchant specific information, etc.).

An authorization request message may be an electronic message that is sent to a transaction processing network and/or an issuer of a payment card to request authorization for a transaction. An authorization request message according to some embodiments may comply with ISO 8583, which is a standard for systems that exchange electronic transaction information associated with a payment made by a consumer using a portable device or payment account. The authorization request message may include an issuer account identifier that may be associated with a portable/payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

The access device 38 or a transactor server 44 electronically transmits this information to an acquirer (e.g., a computer associated with the acquirer). An acquirer may typically refer to a business entity (e.g., a commercial bank or financial institution) that has a business relationship with a particular merchant or similar entity. Some entities can perform both issuer and acquirer functions. The acquirer may then receive, process, and forward the authorization request message to a transaction processing network 40 (e.g., a server computer associated with a transaction processing network 40), such as Visanet, for authorization. In the alternative the access device 38 or transactor server 44 may send the authorization request message to the transaction processing network 40 without the acquirer.

The transaction processing network 40 may then send the authorization request message to an issuer associated with the portable device 36. An issuer may typically refer to a business entity (e.g., a bank or other financial institution) that maintains financial accounts for the user 30 and often issues a portable device 36 such as a credit or debit card to the user 30. The issuer may then generate an authorization response message indicating whether or not the transaction is authorized.

An authorization response message may be an electronic message reply to an authorization request message generated by an issuing financial institution or a transaction or payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant's access device (e.g. POS equipment) that indicates approval of the transaction. The code may serve as proof of authorization.

The authorization response message is then sent to the transaction processing network 40 which may then forward it to the transactor access device 38 (optionally via the acquirer or via the transactor server 44).

In a typical remote transaction, a user 30 may wish to make an online purchase (for example) with a transactor/merchant over the Internet. In this case a user may not use his portable device 36 to interact with an access device 38 as described above. Instead he may enter his payment information via a website associated with the merchant. The transaction may go through the transactor server 44 associated with the merchant, to the transaction processing network (optionally through the acquirer) and then proceeds similar to that which described above for a typical physical and proximity transactions.

At the end of the day, or at some other predetermined period of time, a clearing and settlement process can occur, via the above-described acquirer or issuer (or their respective computers).

III. Exemplary Authentication Methods

Figure 4:
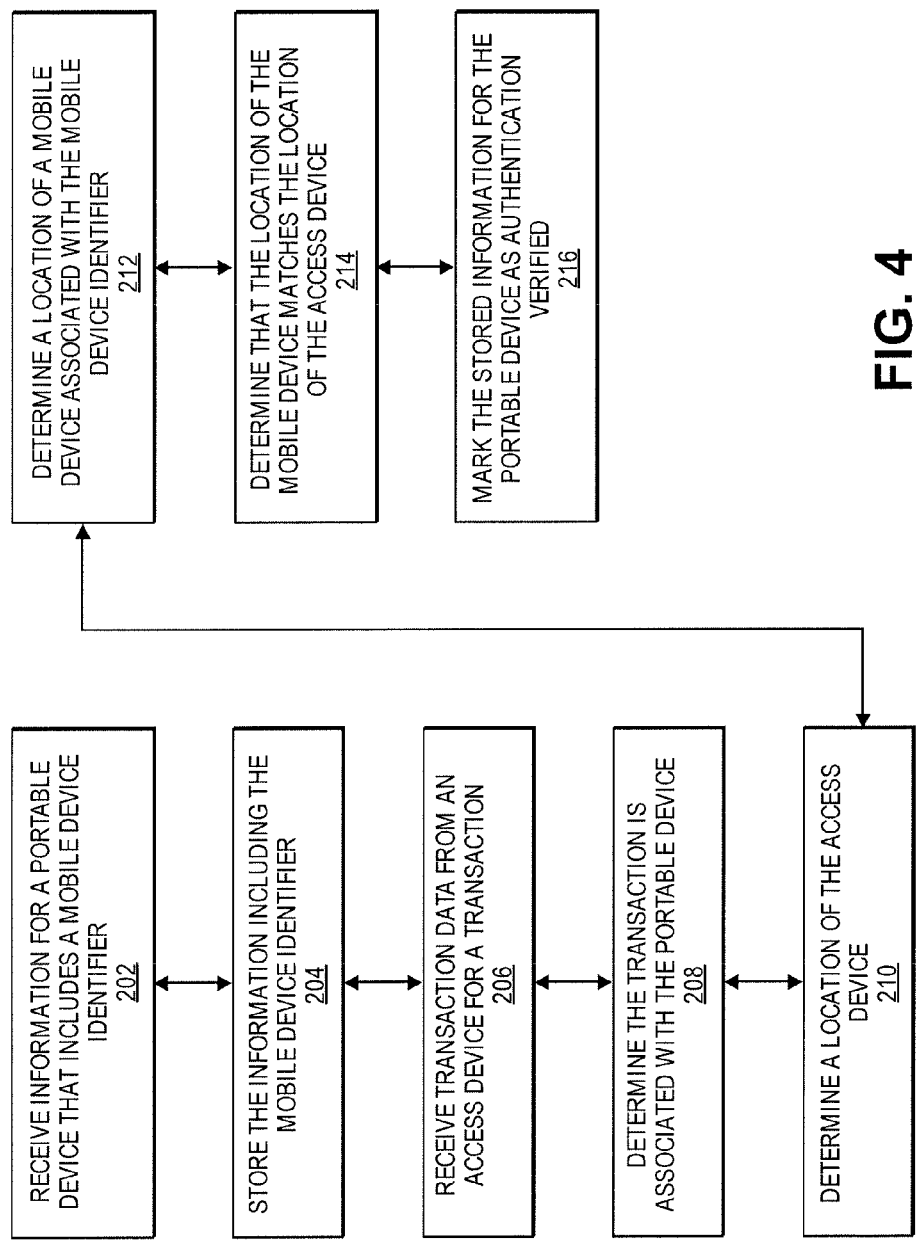
FIG. 4 shows a flowchart of a method according to embodiments of the invention.

FIG. 4 shows a flowchart of an exemplary method according to embodiments of the invention. A user 30 may provide information to register a portable device for authentication for remote transactions. For example, a user may provide this information to a transactor (e.g., merchant) during a remote, physical, or proximity transaction or a user may utilize an electronic wallet (e.g., Amazon wallet, Google wallet, etc.) and provide information in the electronic wallet. The user 30 may provide information that includes his portable device identifier (e.g., an account number associated with his portable device such as a primary account number (PAN)), an expiry date for the portable device, a card verification value (CVV), etc. The user may also provide a mobile phone identifier (e.g., a mobile phone number, SIM card number, device ID number, etc.).

The information for the portable device 36 may be sent from the merchant/transactor server 44 to the transaction processing network 40. A server computer at the transaction processing network 40 may receive the information for the portable consumer device that includes the mobile device identifier (202). The server computer at the transaction processing network 40 may store the information for the portable device 36 that includes the mobile device identifier (204) in an authentication database 42 associated with the transaction processing network 40 and indicate that the stored information is not yet authentication verified. As shown in FIG. 2 the server computer at the transaction processing network 40 may store a unique identifier associated with the portable device 36 (221), a mobile identifier (222), an indication whether the portable device is authentication verified (223), among other information (e.g., 224-229) received from the user 30 or other entities/information.

At a later point in time, the user 30 may conduct a physical or proximity transaction at an access device 38 (e.g., a POS terminal) using the portable device 36. For example, the user 30 may present his portable device 36 to the access device 38 (e.g., POS terminal) to pay for an item or service by swiping the portable device 36 in a slot in the POS terminal by placing the portable device 36 near the POS terminal. The access device 38 or a transactor server 44 associated with the access device 38 may generate an authorization request message that includes the information received from the access device 38 (e.g., information corresponding to the portable device 36) along with additional transaction information (e.g., a transaction amount, merchant specific information, etc.), collectively referred to herein as "transaction data."

The access device 38 or transactor server 44 may then electronically transmit the authorization request message to the transaction processing network 40 (directly or through an acquirer as explained above). The transaction processing network 40 (e.g., a server computer at the transaction processing network 40) may receive the authorization request message with transaction data for the transaction (206).

The transaction processing network 40 may then send the authorization request message to the issuer associated with the portable device 36. The issuer may then generate an authorization response message indicating whether or not the transaction is authorized. The authorization response message is then sent to the transaction processing network 42 which may then forward it to the merchant (optionally via the acquirer). This may be all done before, during, or after the following method.

The transaction processing network 40 determines from the transaction data in the authorization request message, that the transaction is associated with a portable device 36 (208) that has been stored in the authentication database 42 and has not yet been authenticated. For example, the transaction processing network 40 may compare a unique portable device identifier, such as a PAN, included in the authorization request message, with a list of portable device identifiers stored in the authentication database 42. If there is a match between the portable device identifier and a portable device identifier in the authentication database 42 and a field associated with the portable device identifier indicates that the portable device is not yet authentication verified, the transaction processing network 40 can then proceed with authentication verification.

The server computer at the transaction processing network 40 may then determine a location of the access device 38 (210) that sent the authorization request message. The location of the access device 38 may be determined in many different ways. For example, the server computer at the transaction processing network 40 can use information included in the authorization request message such as the merchant identification and location information to determine the location of the access device 38. The information itself may contain location information, e.g., a field in the authorization request message may contain location information such as Target store Albany, Calif. 94706. Or the information may contain a particular merchant store identifier such as Target store number 12345 and the transaction processing network may look up information for this particular store number to get the location of the store. In other embodiments, the access device 38 may have similar capabilities as the mobile device and may have a location determination module such as a GPS module. The location of the access device 38 can then be provided to the server computer.

The server computer at the transaction processing network 40 may then use the mobile identifier stored in the authentication database 42 to determine a location of a mobile device 32 associated with the mobile identifier (212). The location of the mobile device 32 may be determined in many ways. For example, the server computer at the transaction processing network 40 may use GPS, signal tower cell strength, or other location technology to determine a location of the mobile device 32. In some embodiments, the server computer may determine the location of the mobile device 32 only in response to receiving the authorization request message. In other embodiments, the server computer may periodically contact the mobile device 32 (i.e., "ping" the mobile device) to determine its location and this location may be stored in a database. Such embodiments have advantages over the former embodiments, since the mobile device may not always be accessible when the user conducts a transaction. By periodically contacting the phone, a recent location will always be present.

In another example, the server computer can send a message (e.g., via SMS, MMS, email, etc.) to the mobile device 32 using the mobile device identifier to verify that the user 30 is making or recently made a purchase at that particular merchant. For example, the server computer can send a text or email message asking the consumer "Did you just make a purchase at Target for $25.23?" Or, the server computer can send a challenge question asking the user "Did you make a purchase today at Target for $25, $30, or $45?" The user may respond with an answer. If the user does not respond, responds that he did not make the purchase, or responds incorrectly, the process will end and the portable device 36 will remain unverified.

If the server computer at the transaction processing network 40 determines a location of the mobile device 32 via location technology or receives a response indicating that the user did make the purchase, the server computer can confirm the location of the mobile device 32. The server computer at the transaction processing network 40 may determine whether the location of the access device 38 matches the location of the mobile device 32 (214) by comparing the location of each. For example, the location of the access device 38 may be Target Albany, Calif. 94706 and the location of the mobile device 32 may be near the Target Albany 94706 (e.g., within a predetermined distance from the location of the access device 38 such as 0.25 miles). Or, the location of the access device 38 may be Target Albany, Calif. 94706 and the transaction processing network 40 may have confirmed that the user made a purchase with the portable device 36 at the Target Albany, Calif. 94706. In some embodiments, the location of the mobile device 32 and the location of the access device 38 can be converted to latitude and longitude coordinates, and the coordinates of the mobile device 32 and the access device 38 may be compared to determine if they are co-located.

If the locations match, the server computer at the transaction processing network 40 may mark the stored information for the portable device 36 as authentication verified in the authentication database 42 (216). The transaction processing network 40 may also generate a digital certificate to indicate that the portable device 36 is authentication verified and may store the digital certificate in the authentication database 42. The transaction processing network 40 may also generate a verification value such as an AAV (Accountholder Authentication Value) or a CAVV (Cardholder Authentication Verification Value) and may store the value in the authentication database 42. Such values may be cryptograms generated at least in part of the portable device identifiers. If the location of the access device 38 and the location of the portable device 36 do not match, the authentication process ends and the portable device 36 will remain unverified.

If the portable device 36 is marked as authentication verified in the authentication database 42, then the next time the user 30 uses the portable device 36 in a remote transaction, the remote transaction can proceed as an authentication verified transaction. For example, the user 30 may wish to make a remote purchase transaction with a merchant/transactor via the merchant's website over the internet or via an application installed on a mobile device 32 or client computer 34. The transaction environment may include mobile internet, mobile application (app), MOTO, and even an in-store environment where the user 30 interacts with the store via Airdrop, WIFI, peer-to peer wireless, etc. The user 30 may enter his portable device information (and other information) using a keyboard or other means on his client computer 34 or mobile device 32. Once the user 30 enters the information, the transactor server 44 associated with the merchant website, receives the information and generates an authorization request message that includes transaction data including the information received from the user 30.

In an alternative embodiment of the invention, the access device 38 or transactor server 44 associated with the access device 38 may generate a message to send transaction data to the transaction processing network 40 directly, before generating an authorization request message, to request information about whether the portable device 36 is authentication verified. The transactor server 44 may send message with the transaction data to the transaction processing network 40.

A server computer at the transaction processing network 40 receives the transaction data for the remote transaction. The server computer at the transaction processing network 40 determines whether the remote transaction is associated with a portable device 36 that is stored in the authentication database 42. For example, the server computer at the transaction processing network 40 may compare a portable device identifier included in the transaction data against a list of portable device identifiers stored in an authentication database 42. If there is a match between the portable device identifier included in the transaction data and a portable device identifier in the authentication database 42, then the server computer at the transaction processing network 40 checks to see whether the portable device 36 is authentication verified. As shown in FIG. 2, for example, the transaction process network 40 may look at a field 223 in the authentication database 42 associated with the portable device 36 that indicates whether the portable device 36 is authentication verified or not.

If the portable device 36 is not authentication verified, the server computer returns a message to the transactor server 44 indicating that the portable device 36 is not authentication verified. If the portable device 36 is authentication verified, the server computer returns a message to the transactor server 44 indicating the status of the portable device 36 as authentication verified. The message may include a verification value such as a CAVV or AAV and/or a digital certificate that can be used to send an authorization request message to an issuer. The transaction processing network 40 may add the verification value and/or a digital certificate to an authorization request message to the issuer to authorize the transaction or the transactor server 44 may generate the authorization request message with the verification value and/or the digital certificate. Optionally the merchant/transactor may store the authentication verification (and verification value and/or digital certificate, etc.) locally at the merchant (e.g., in a database associated with the transactor server 44). If the merchant/transactor stores the authentication verification information locally, then the next time the user 30 uses the portable device 36 in a remote transaction, the merchant can look up the portable device 36 (e.g., a unique identifier associated with the portable device 36) in a database associated with the transactor, and determine whether the portable device 36 is authentication verified instead of sending transaction data to the transaction processing network to determine authentication verification. The process may be similar to what is described above for looking up the portable device 36 in the authentication database 42.

The authorization request message may then be sent to the issuer associated with the portable device 36. The issuer may then generate an authorization response message indicating whether or not the transaction is authorized. The authorization response message is then sent to the transaction processing network 42 which may then forward it to the transactor server 44 (optionally via the acquirer).

Figure 5:
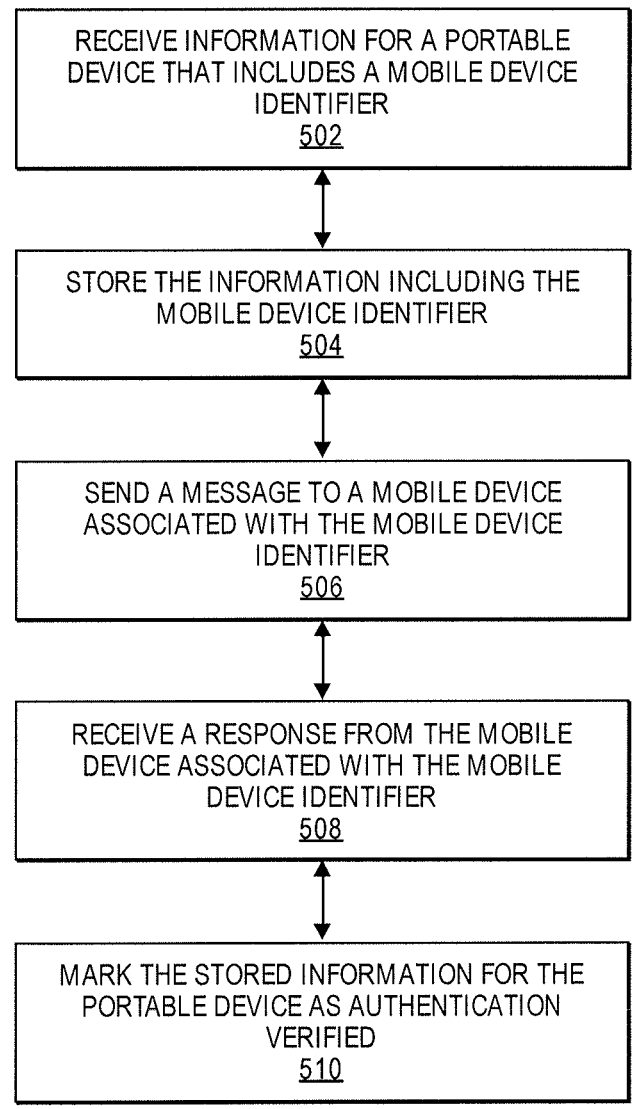
FIG. 5 shows a flowchart of a method according to embodiments of the invention.

FIG. 5 shows a flowchart of an exemplary method according to embodiments of the invention. In this embodiment, a user 30 may conduct a physical or proximity transaction at an access device 38 (e.g., a POS terminal) using a portable device 36. For example, the user 30 may present his portable device 36 to the access device 38 (e.g., POS terminal) to pay for an item or service by swiping the portable device 36 in a slot in the POS terminal or waving or holding the portable device 36 near the POS terminal. The user may be given the option to enter a mobile device identifier (e.g., a mobile phone number) at the access device 38 or the mobile device identifier may be stored on the portable device 36 and transferred automatically to the access device 38. The access device 38 or a transactor server 44 associated with the access device 38 may generate an authorization request message that includes the information received from the access device 38 (e.g., information corresponding to the portable device 36) along with additional transaction information (e.g., a transaction amount, merchant specific information, etc.) and including the mobile device identifier.

The access device 38 or transactor server 44 may then electronically transmit the authorization request message to the transaction processing network 40 (directly or through an acquirer as explained above). The transaction processing network 40 (e.g., a server computer at the transaction processing network 40) may receive the authorization request message with transaction data for the transaction that includes the mobile identifier (502). The server computer at the transaction processing network 40 may store the information for the portable device 36 that includes the mobile device identifier (504) in an authentication database 42 associated with the transaction processing network 40 and indicate that the stored information is not yet authentication verified. As shown in FIG. 2 the server computer at the transaction processing network 40 may store a unique identifier associated with the portable device 36 (221), a mobile identifier (222), an indication whether the portable device 36 is authentication verified (223), among other information received from the user 30 or other entities/information.

The transaction processing network 40 may then send a message to a mobile device 32 associated with the mobile device identifier (506) to ask the user 30 if he would like to register the portable device 36. If the transaction processing network 40 receives a response from the user indicating that he would like to register the portable device 36 (508), the transaction processing network 40 may mark the stored information for the portable device 36 as authentication verified in the authentication database 42 (510). The transaction processing network 40 may also generate a digital certificate to indicate that the portable device 36 is authentication verified and store the digital certificate in the authentication database 42. The transaction processing network 40 may also generate an AAV (Accountholder Authentication Value) or a CAVV (Cardholder Authentication Verification Value) and store the value in the authentication database 42.

Figure 6:
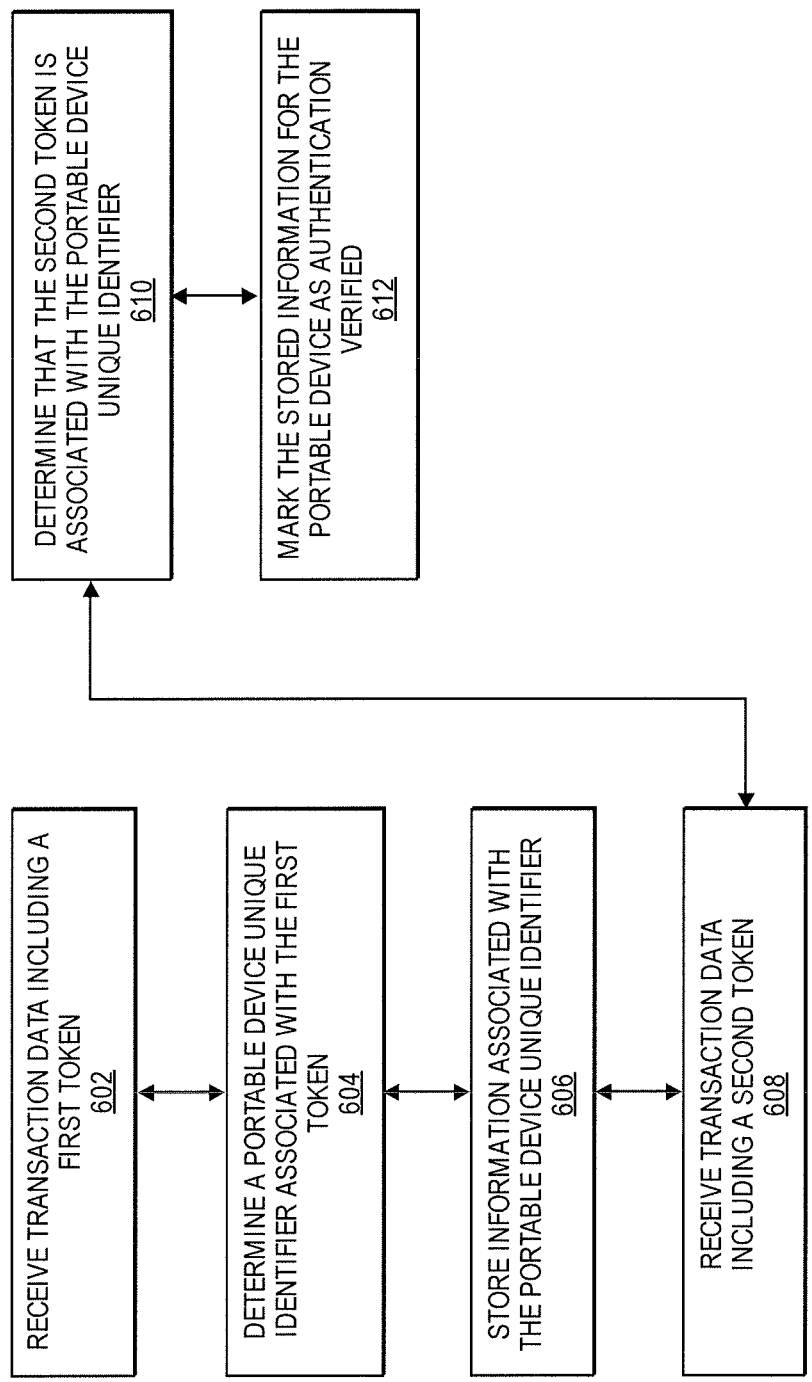
FIG. 6 shows a flowchart of a method according to embodiments of the invention.

FIG. 6 shows a flowchart of an exemplary method according to embodiments of the invention that utilizes tokens to authenticate a portable device. In traditional payment transactions, a unique identifier such as a PAN is used to identify the portable device. This portable device unique identifier is exposed to various entities involved in the transactions. For example, a PAN may be passed from an access device, to an acquirer system, a transaction processing network, payment gateways, etc. Because the PAN or other portable device unique identifier can be exposed at various points in processing the transaction, a "token" may be used to conduct payment transactions, instead of the portable device unique identifier. A token serves as an additional security layer to the unique identifier and in effect becomes a proxy/surrogate to the portable device unique identifier and may be used in place of the portable device unique identifier while submitting transactions. There may be more than one token associated with a single portable device unique identifier. For example, a token may be device specific such that each device is associated with a separate token for the same portable device unique identifier. For example, a first token may be used to conduct a payment with a mobile device (e.g., mobile phone, tablet, etc.) and a second token may be used to conduct a payment with a payment card (e.g., credit card, debit card, gift card, etc.). Whether a user uses the mobile device or the payment card to conduct a transaction, the token for each device will be resolved at the back end to a single portable device unique identifier. Embodiments of the invention may utilize two different tokens to authenticate a portable device.

A user 30 may conduct a transaction using a portable device 36 as described above (e.g., a physical, proximity, or remote transaction). An access device 38 or a transactor server 44 may send transaction data to the transaction processing network 40 (e.g., to a server at the transaction processing network). The transaction data may be in the form of an authorization request message and may include information corresponding to the portable device 36 along with transaction information (e.g., a transaction amount, merchant specific information, etc.). Instead of the portable device unique identifier, a first token may be used as the portable device identifier.

The transaction processing network 40 may receive the transaction data including the first token (602). The transaction processing network 40 determines a portable device unique identifier associated with the first token (604). For example, the transaction processing network 40 may look up a record in a database associated with the token to determine the portable device unique identifier for the token. The transaction processing network 40 may then store information associated with the portable device unique identifier (606) in an authentication database 42 associated with the transaction processing network 40 and indicate that the portable device is not yet authentication verified. As shown in FIG. 2 the server computer at the transaction processing network 40 may store a unique identifier associated with the portable device 36 (221), an indication whether the portable device is authentication verified (223), among other information (e.g., 224-229) received from the user 30 or other entities/information.

The user 30 may conduct a second transaction using a portable device 36 as described above (e.g., a physical, proximity, or remote transaction). An access device 38 or a transactor server 44 may send transaction data to the transaction processing network 40 (e.g., to a server at the transaction processing network). The transaction data may be in the form of an authorization request message and may include information corresponding to the portable device 36 along with transaction information (e.g., a transaction amount, merchant specific information, etc.). Instead of the portable device unique identifier, a second token may be used as the portable device identifier. For example, the second transaction may be conducted with a device different that used for the first transaction.

The transaction processing network 40 may receive the transaction data including the second token (608). The transaction processing network 40 may determine a portable device unique identifier associated with the second token (610). For example, the transaction processing network 40 may look up a record in a database associated with the token to determine the portable device unique identifier for the token. The transaction processing network 40 then determines that the second token is associated with a portable device unique identifier that has not yet been authentication verified. For example, the transaction processing network 40 may compare the portable device unique identifier with a list of portable device identifiers stored in the authentication database 42. If there is a match between the portable device identifier and a portable device identifier in the authentication database 42 and a field associated with the portable device identifier indicates that the portable device is not yet authentication verified, the transaction processing network 40 can then mark the stored information for the portable device as authentication verified (612). The transaction processing network 40 may also generate a digital certificate to indicate that the portable device 36 is authentication verified and may store the digital certificate in the authentication database 42. The transaction processing network 40 may also generate a verification value such as an AAV (Accountholder Authentication Value) or a CAVV (Cardholder Authentication Verification Value) and may store the value in the authentication database 42.

Once the portable device 36 is marked as authentication verified in the authentication database 42, then the next time the user 30 uses the portable device 36 in a transaction, the transaction can proceed as an authentication verified transaction, as described above.

IV. Exemplary Devices

Provided below are descriptions of some devices (and components of those devices) that may be used in the systems and methods described above. These devices may be used, for instance, to receive, transmit, process, and/or store data related to any of the functionality described above. As would be appreciated by one of ordinary skill in the art, the devices described below may have only some of the components described below, or may have additional components.

Figure 7:
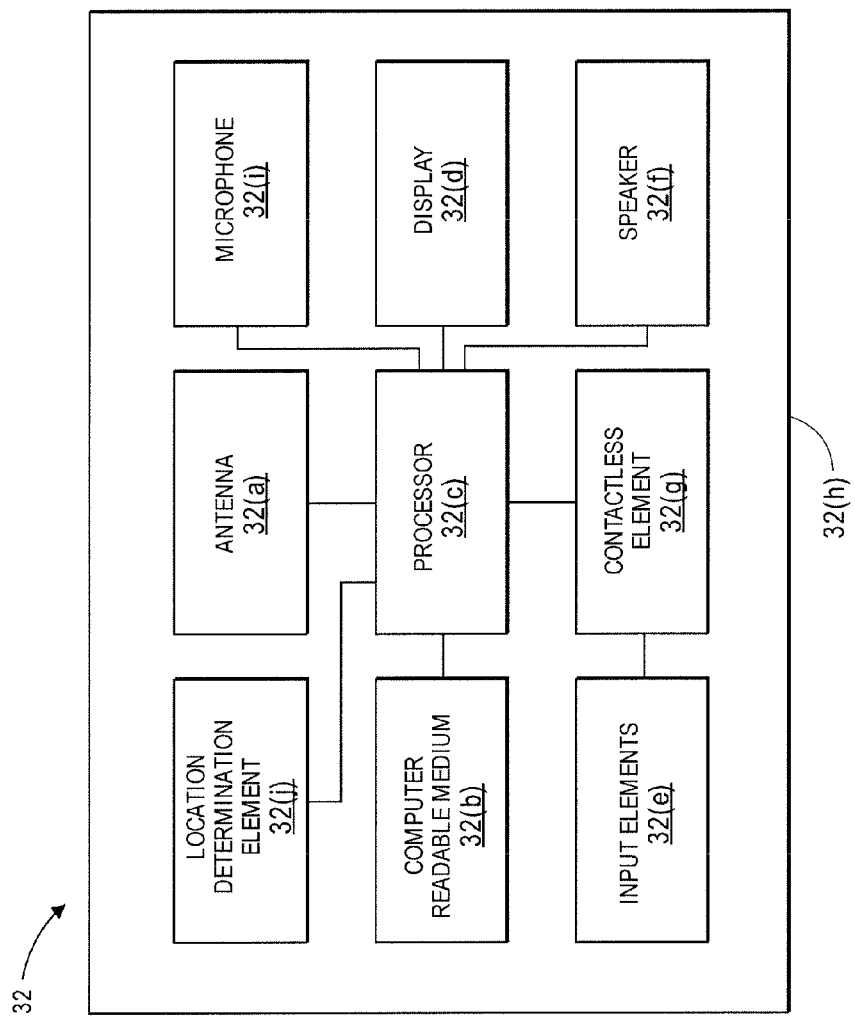
FIG. 7 shows an exemplary device according to embodiments of the invention.

With reference to FIG. 7, a block diagram of an exemplary mobile device 32 is shown that may be used in some embodiments. In some embodiments, the mobile device 32 may be a notification device that can receive alert messages, a payment or portable device that can be used to make payments, an access device (e.g. POS device) that may receive information from a consumer to conduct a transaction, and/or a multi-purpose general use device. The exemplary mobile device 32 may comprise a computer readable medium 32(b) that be present within the body (or outer casing) 32(h), or the computer readable medium 32(b) could be detachable from the device (e.g. the computer readable medium 32(b) could comprise an external memory that could be connected through a physical interface such as a USB connection, or the data could be hosted remotely and accessed wirelessly by the device—e.g. the data could be hosted and stored at a remoter server in the "cloud"). The computer readable medium 32(b) may be in the form of a memory that stores data. The memory may store information such as financial information, transit information (e.g., as in a subway or train pass), access information (e.g., access badges), serial numbers, mobile account information, and any other suitable information. In general, any of this information may be transmitted by the mobile device 32 (such as to an access device 38), via any suitable method, including the use of antenna 32(a) or contactless element 32(g). The body 32(h) may be in the form a plastic substrate, housing, or other structure.

In some embodiments, the mobile device 32 may further include a contactless element 32(g), which is typically implemented in the form of a semiconductor chip (or other data storage element) with an associated wireless transfer (e.g., data transmission) element, such as an antenna. Contactless element 32(g) may be coupled to (e.g., embedded within) the mobile device 32 and data or control instructions that are transmitted via a cellular network may be applied to the contactless element 32(g) by means of a contactless element interface (not shown). The contactless element interface functions to permit the exchange of data and/or control instructions between the mobile device circuitry and an optional contactless element 32(g), or between another device having a contactless element (e.g. a POS terminal or a portable/payment device). Contactless element 32(g) may be capable of transferring and receiving data using a short range wireless communication capability. As noted above, mobile device 32 may comprise components to both be the interrogator device (e.g. receiving data) and the interrogated device (e.g. sending data). Thus, the mobile device 32 may be capable of communicating and transferring data or control instructions via both cellular network (or any other suitable wireless network—e.g. the Internet or other data network) and short range communications.

The mobile device 32 may also include a processor 32(c) (e.g., a microprocessor) for processing the functions of the mobile device 32 and a display 32(d) to allow a user to see phone numbers and other information and messages. The mobile device 32 may further include input elements 32(e) to allow a user to input information into the device, a speaker 32(f) to allow the user to hear voice communication, music, etc., and a microphone 32(i) to allow the user to transmit her voice through the mobile device 32. The mobile device 32 may also include an antenna 32(a) for wireless data transfer (e.g., data transmission). The mobile device 32 may further include a location determination element 32(j) that may be hardware and/or software capable of determining location coordinates (e.g., a GPS element).

The various participants and elements (e.g., the transaction processing network, transactor, acquirer, issuer, etc.) in embodiments of the invention may also operate one or more computer apparatuses (e.g., a server computer, client computer, mobile device, access device, transactor server, etc.) to facilitate the functions described herein. Any of the elements in embodiments of the invention may use any suitable number of subsystems to facilitate the functions described herein. Examples of such subsystems or components are shown in FIG. 8.

Figure 8:
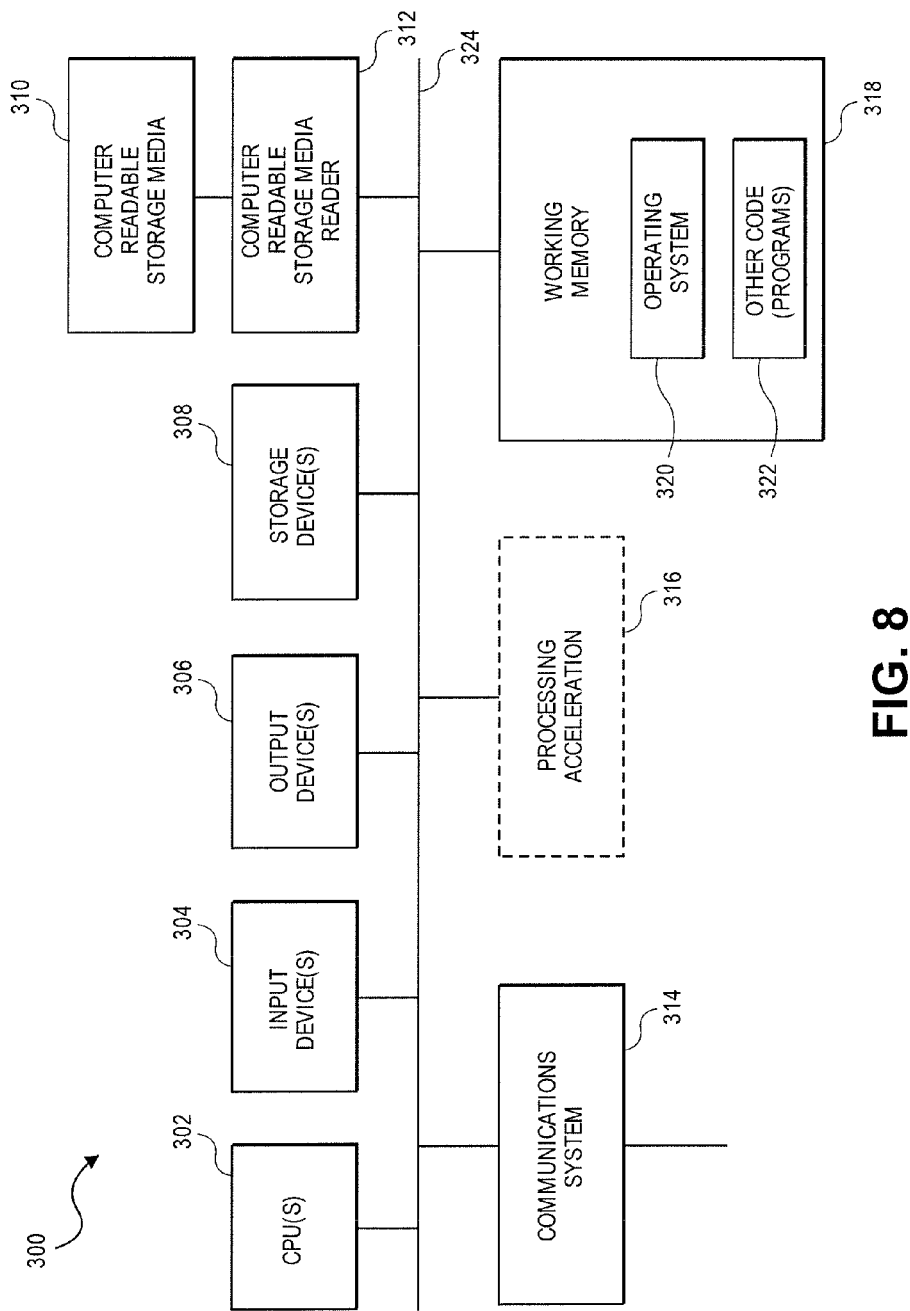
FIG. 8 shows an exemplary computer system according to embodiments of the invention.

FIG. 8 illustrates an exemplary computer system 300, in which various embodiments may be implemented. The system 300 may be used to implement any of the computer systems described above (e.g., a server computer, client computer, mobile device, access device, transactor server, etc.). The computer system 300 is shown comprising hardware elements that may be electrically coupled via a bus 324. The hardware elements may include one or more central processing units (CPUs) 302, one or more input devices 304 (e.g., a mouse, a keyboard, touchpad, etc.), and one or more output devices 306 (e.g., a display device, a printer, etc.). The computer system 300 may also include one or more storage devices 308. By way of example, the storage device(s) 308 may include devices such as disk drives, optical storage devices, solid-state storage device such as a random access memory ("RAM") and/or a read-only memory ("ROM"), which may be programmable, flash-updateable and/or the like.

The computer system 300 may additionally include a computer-readable storage media reader 312, a communications system 314 (e.g., a modem, a network card (wireless or wired), an infra-red communication device, etc.), and working memory 318, which may include RAM and ROM devices as described above. In some embodiments, the computer system 300 may also include a processing acceleration unit 316, which may include a digital signal processor DSP, a special-purpose processor, and/or the like.

The computer-readable storage media reader 312 may further be connected to a computer-readable storage medium 310, together (and, optionally, in combination with storage device(s) 308) comprehensively representing remote, local, fixed, and/or removable storage devices plus storage media for temporarily and/or more permanently containing, storing, transmitting, and retrieving computer-readable information. The communications system 314 may permit data to be exchanged with the network and/or any other computer described above with respect to the system 300.

The computer system 300 may also comprise software elements, shown as being currently located within a working memory 318, including an operating system 320 and/or other code 322, such as an application program (which may be a client application, Web browser, mid-tier application, RDBMS, etc.). It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

Embodiments of the invention have a number of advantages. In conventional transaction systems, payment processors and issuers have a difficult time determining whether or not transactions conducted remotely with mobile devices are authentic or not, since a physical portable device such as a physical credit card is not present. By using embodiments of the invention, a transaction conducted remotely with a mobile device can be verified such that a payment processor or issuer can have confidence that the mobile device conducting the transaction is authentic. Consequently, the approval of potentially fraudulent transactions is significantly reduced using embodiments of the invention. Further, the verification process utilized is relatively seamless and convenient, since the user uses a normal payment transaction to verify that future transactions conducted with a mobile device are authentic.

It should be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   receiving, at a server computer, portable device information and a mobile device identifier associated with a mobile device;
   storing, by the server computer, the portable device information and the mobile device identifier in a database associated with the server computer;
   receiving, by the server computer, first transaction data from an access device for a physical or proximity transaction conducted at the access device, wherein the physical or proximity transaction includes physically presenting the portable device to the access device to provide portable device data to the access device;
   determining, by the server computer, from the first transaction data that the physical or proximity transaction is associated with the portable device;
   determining, by the server computer, a location of the access device;
   determining, by the server computer, a location of the mobile device associated with the mobile device identifier;
   determining, by the server computer, that the location of the mobile device matches the location of the access device;
   marking, by the server computer, the stored portable device information and the stored mobile device identifier as authentication verified;
   generating, by the server computer, a verification value or a digital certificate indicating that the status of the portable device is authentication verified;
   storing, by the server computer, the verification value or the digital certificate;
   receiving, at the server computer, second transaction data from a transactor computer for a remote transaction conducted via the transactor computer, wherein the remote transaction includes providing the portable device data to the transactor computer over a network without physically presenting the portable device to an access device;
   determining, by the server computer, from the second transaction data that the remote transaction is associated with the portable device;
   determining, by the server computer, that the stored portable device information and the stored mobile device identifier are marked as authentication verified;
   identifying, by the server computer, the stored the verification value or the digital certificate; and
   sending, by the server computer, a message indicating the status of the portable device as authentication verified to the transactor computer or to an issuer, the message including the verification value or the digital certificate, wherein the verification value or the digital certificate is subsequently used in a determination as to whether the remote transaction is fraudulent.

2. The method of claim 1 wherein determining the location of the access device includes determining the location of the access device from location information included in the transaction data.

3. The method of claim 1 wherein determining the location of the mobile device includes sending a message to the mobile device requesting information to confirm the location of the mobile device.

4. The method of claim 3 wherein requesting information includes a request for confirmation for a recent transaction or a challenge question.

5. The method of claim 1 wherein determining the location of the mobile device includes utilizing location technology to determine the geographical position of the mobile device.

6. The method of claim 1 wherein storing the information for the portable device that includes the mobile device identifier further comprises indicating that the stored information for the portable device is not yet authentication verified.

7. The method of claim 1, wherein the portable device information and the mobile device identifier are provided by a user during an initial transaction before the physical or proximity transaction.

8. The method of claim 1, wherein the portable device information and the mobile device identifier are provided by a user via an electronic wallet.

9. The method of claim 1 wherein the message indicating the status of the portable device as authentication verified is sent to the transactor computer, and wherein the method further comprises:
   receiving, at the server computer, from the transactor computer, an authorization request message for the remote transaction, the authorization request message including the verification value or the digital certificate;
   determining, by the server computer, that the remote transaction is authentic based on the verification value or the digital certificate; and
   forwarding, by the server computer, to the issuer, the authorization request message for the remote transaction including the verification value or the digital certificate, wherein the issuer authorizes the remote transaction based on the verification value or the digital certificate.

10. The method of claim 1, wherein storing the portable device information and the mobile device identifier in a database associated with the server computer causes the mobile device to be associated with the portable device at the server computer, wherein the remote transaction associated with the portable device is initiated via the mobile device, and wherein the remote transaction is considered an authentication verified transaction because it is initiated via the mobile device and the mobile device is verified as being associated with the portable device.

11. The method of claim 1, wherein marking the stored portable device information and the stored mobile device identifier as authentication verified indicates that an association between the mobile device and portable device is verified, and that the portable device is eligible for use in remote transactions without having to check or compare a physical location.

12. The method of claim 1, wherein a physical transaction is a contact transaction, and wherein a proximity transaction is a contactless NFC transaction.

13. A server computer comprising:
   a processor; and
   a non-transitory computer readable medium coupled with the processor, the computer readable medium comprising instructions executable by the processor, the instructions comprising:
   receiving portable device information and a mobile device identifier associated with a mobile device;
   storing the portable device information and the mobile device identifier in a database associated with the server computer;
   receiving first transaction data from an access device for a physical or proximity transaction conducted at the access device, wherein the physical or proximity transaction includes physically presenting the portable device to the access device to provide portable device data to the access device;
   determining from the first transaction data that the physical or proximity transaction is associated with the portable device;
   determining a location of the access device;
   determining a location of the mobile device associated with the mobile device identifier;
   determining that the location of the mobile device matches the location of the access device;
   marking the stored portable device information and the stored mobile device identifier as authentication verified;
   generating a verification value or a digital certificate indicating that the status of the portable device is authentication verified;
   storing the verification value or the digital certificate;
   receiving second transaction data from a transactor computer for a remote transaction conducted via the transactor computer, wherein the remote transaction includes providing the portable device data to the transactor computer over a network without physically presenting the portable device to an access device;
   determining from the second transaction data that the remote transaction is associated with the portable device;
   determining that the stored portable device information and the stored mobile device identifier are marked as authentication verified;
   identifying the stored the verification value or the digital certificate; and
   sending a message indicating the status of the portable device as authentication verified to the transactor computer or to an issuer, the message including the verification value or the digital certificate, wherein the verification value or the digital certificate is subsequently used in a determination as to whether the remote transaction is fraudulent.

14. The server computer of claim 13 wherein determining the location of the access device includes determining the location of the access device from location information included in the transaction data.

15. The server computer of claim 13 wherein determining the location of the mobile device includes sending a message to the mobile device requesting information to confirm the location of the mobile device.

16. The server computer of claim 13 wherein requesting information includes a request for confirmation for a recent transaction or a challenge question.

17. The server computer of claim 13 wherein determining the location of the mobile device includes utilizing location technology to determine the geographical position of the mobile device.

18. The server computer of claim 13 wherein storing the information for the portable device that includes the mobile device identifier further comprises indicating that the stored information for the portable device is not yet authentication verified.

19. The server computer of claim 13 wherein the access device is an electronic cash register.

20. A computer apparatus comprising:
   a processor; and
   a non-transitory computer readable medium coupled with the processor, the computer readable medium comprising instructions executable by the processor, the instructions comprising:

sending portable device information and a mobile device identifier associated with a mobile device, to a server computer wherein the server computer stores the portable device information and the mobile device identifier in a database associated with the server computer;

receiving first transaction data for a physical or proximity transaction conducted using the portable device, wherein the physical or proximity transaction includes physically presenting the portable device to an access device to provide portable device data to the access device;

sending the first transaction data to the server computer wherein the server computer determines a location of an access device associated with the mobile device identifier, determines a location of the mobile device associated with the mobile device identifier, determines that the location of the mobile device identifier matches the location of the access device, marks the stored portable device information and the stored mobile device identifier in the database as authentication verified, generates a verification value or a digital certificate indicating that the status of the portable device is authentication verified, and stores the verification value or the digital certificate;

receiving second transaction data for a remote transaction, wherein the remote transaction includes providing the portable device data over a network without physically presenting the portable device to the access device; and sending the second transaction data to the server computer wherein the server computer determines from the second transaction data that the remote transaction is associated with the portable device, determines that the stored portable device information the stored mobile device identifier are marked as authentication verified, identifies the stored the verification value or the digital certificate, and sends a message indicating the status of the portable device as authentication verified, the message including the verification value or the digital certificate, wherein the verification value or the digital certificate is subsequently used in a determination as to whether the remote transaction is fraudulent.

* * * * *